United States Patent [19]
Laurent

[11] Patent Number: 5,526,910
[45] Date of Patent: Jun. 18, 1996

[54] FREE WHEEL DEVICE

[75] Inventor: Jean M. Laurent, Villebon sur Yvette, France

[73] Assignee: SKF France, Clamart Cedex, France

[21] Appl. No.: 919,785

[22] Filed: Jul. 27, 1992

[30] Foreign Application Priority Data

Jul. 30, 1991 [FR] France .................. 91 09680

[51] Int. Cl.⁶ .................................. F16D 41/07
[52] U.S. Cl. ........................ 192/45.1; 192/41 A
[58] Field of Search .................. 192/45.1, 41 A

[56] References Cited

U.S. PATENT DOCUMENTS

| | | | |
|---|---|---|---|
| 2,638,195 | 5/1953 | Tibbetts | 192/45.1 |
| 2,683,510 | 7/1954 | Troendly | 192/45.1 |
| 2,744,598 | 5/1956 | Troendly | 192/45.1 |
| 2,750,019 | 6/1956 | Ferris | 192/45.1 |
| 5,016,741 | 5/1991 | Leitz | 192/45.1 |

*Primary Examiner*—Richard M. Lorence
*Attorney, Agent, or Firm*—Beveridge, DeGrandi, Weilacher & Young

[57] ABSTRACT

Free wheel device designed to be inserted between the outer cylindrical surface of a shaft and the cylindrical bore of a housing, of the type comprising a plurality of catching cams (1) retained solely by a spring strip of annular shape (11) having apertures (12) for the cams and return tabs (13) acting on the cams, wherein the lateral edges (14) of the spring (11) are locked axially with lateral retention components (16, 17) giving the spring (11) its final annular shape.

28 Claims, 9 Drawing Sheets

FIG.1

Prior Art

FIG.2

Prior Art

FREE WHEEL DEVICE

The present invention relates to a free wheel device capable of being fitted between a shaft and a bore and comprising a plurality of catching cams retained by a spring strip of annular shape having apertures for the cams and return tabs acting on the cams. The invention can be applied in particular in the case of free wheel devices with lateral bearings.

Free wheel devices of this type which are already known and described for example in French Patent Application 2,588,340 (SKF), generally comprise a cavitied cage, a plurality of catching cams, a return spring for the cams which is in the form of a cavitied strip rolled up inside the cage and acting on the various cams through the intermediary of return tabs. The device further comprises two lateral bearings designed to ensure the mutual centering of the shaft and of the housing between which the free wheel is fitted and to support the radial loads between said shaft and said housing. Such devices have the disadvantage of comprising a fairly large number of different components and of being relatively heavy. Moreover, no means for axial locking between the various components and in particular between the lateral bearings and the other components of the free wheel device are envisaged, which leads to difficulties in assembling and in handling of the free wheel device before fitting between the shaft and bore.

Means for axial locking between the lateral bearings and the other components of a free wheel device have been provided in French Patent Applications 2,618,195 and 2,618,196 (SKF). These means are however of a certain complexity in so far as they call upon supplementary added parts. Moreover, these means further increase the weight of the free wheel device or in any case do not reduce it, in particular when the locking means comprise components taken from the cage.

The subject of the present invention is a free wheel device not having the disadvantages of the state of the art and in particular constituting an assembly of parts of reduced number, all of which are retained and locked axially before fitting the free wheel device between a shaft and a bore, thus providing an assembly which is inexpensive to produce, light, compact and easy to handle before fitting.

The solution provided for this problem by the invention resides in the recognition of the fact that the metal cage retaining the cams in the prior free wheel device can be eliminated. In fact, the principal role of such a metal cage in the free wheel device of the state of the art is to retain the assembly constituted by the catching cams and the spring in its annular shape and in its structure, permitting both the handling of the assembly before fitting and the insertion during the fitting between the shaft and the bore which receives the free wheel device. Once the free wheel device has been put into place in this manner, the metal cage no longer has any instrumental functional role.

The free wheel device according to the invention designed to be inserted between the outer cylindrical surface of a shaft and the cylindrical bore of a housing is of the type comprising a plurality of catching cams retained solely by a spring strip of annular shape having apertures for the cams and return tabs acting on the cams. According to the invention, the lateral edges of the spring are locked axially with lateral retention components giving the spring its final annular shape.

Under these conditions, the separate metal cage of the free wheel device of the state of the art is replaced by lateral retention components which are constructed so as to be capable on their own of giving the spring equipped with the catching cams the final annular shape and the appropriate structure for handling the device before fitting and for its insertion between the shaft and the bore.

The lateral retention components are preferably constructed of synthetic material combining lightness and a low production cost which can be produced for example by injection molding. It is the appropriate shape and rigidity of the lateral retention components which give the spring strip designed to receive the cams its final annular shape; the spring, by virtue of its function, not in itself having sufficient rigidity.

The lateral edges of the spring may comprise axial catching means interacting with the retention components for locking the spring with said retention components.

According to another embodiment, the lateral edges of the spring may be pinched radially in annular axial slots made on the retention components in order to lock the spring with said retention components.

According to another embodiment, the retention components may be molded onto the lateral edges of the spring. In this case, and depending on the production imperatives, the retention components may be constituted by several individual annular sectors molded respectively onto the inside and onto the outside of the spring. Anchoring components such as perforations are preferably provided on the surface of the lateral edges of the spring in order to improve the locking of the retention components molded onto the spring.

In the case where the free wheel device additionally comprises annular lateral bearings of U-shaped cross section having an inner wing and an outer wing which are orientated in the direction of the cams, the retention components are advantageously fitted between the two wings of said lateral bearings.

The retention components may advantageously serve for the axial locking of the lateral bearings with the rest of the free wheel. This locking may be produced by radial resilient gripping of the retention components between the inner and outer wings of the lateral bearings.

As a variant, the locking of the retention components with the lateral bearings may be obtained by mating of shape between said retention components and the inner and outer wings of the lateral bearings.

For this purpose, the retention components may comprise for example catches placed at the periphery of said retention components and capable of entering channels made on the inner and outer wings of the lateral bearings.

Each lateral retention component may be constituted by two rings capable of being inserted into a lateral bearing between its inner and outer wings by gripping the lateral edges of the spring. The outer rings may advantageously comprise a radial slot in order to facilitate fitting and to provide by resilience a radial prestress of said ring in the outer wing of the lateral bearing after fitting.

The invention will be better understood by studying the detailed description of some embodiments given as by way of non-limitative examples and illustrated by the accompanying drawings in which.

Figure 1:
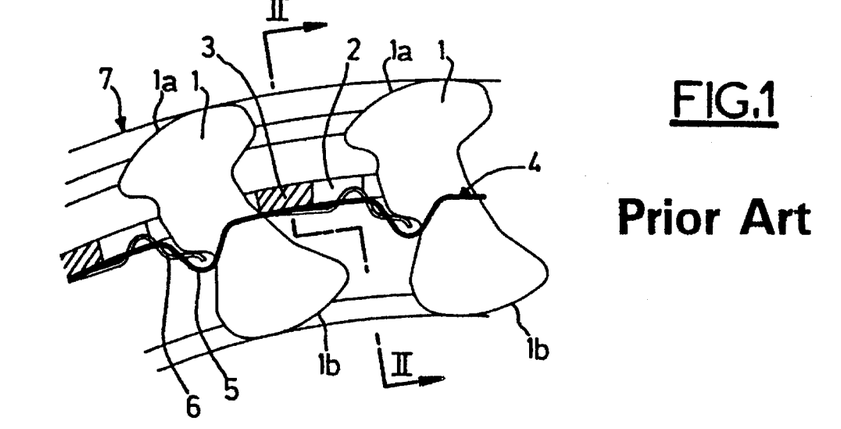
FIG. 1 a partial view in cross section along a transverse radial plane of a free wheel device of the prior art.
Figure 2:
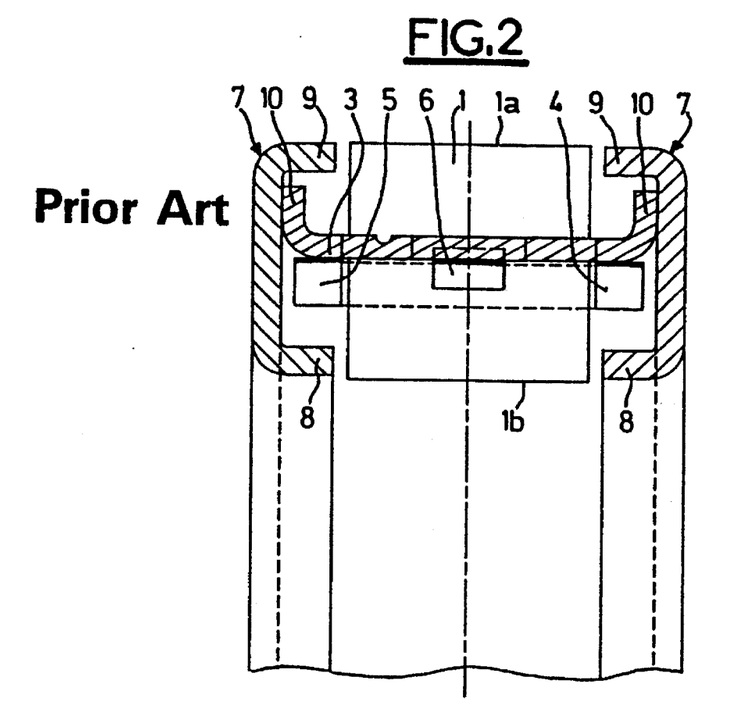
FIG. 2 is a partial view in cross section along II—II of the free wheel device of the prior art of FIG. 1.

FIGS. 1 and 2 correspond to the prior art. As can be seen in these figures, a free wheel device of known type comprises a plurality of catching cams 1 fitted inside windows or cavities 2 made in a metal cage 3 of annular shape having a sufficient rigidity to give the set of cams 1 distributed on its periphery the desired annular shape and to maintain this shape during the handling operations prior to fitting the assembly between a shaft and a housing which are not shown in the figures. In operation, the simultaneous return of the cams 1 in the direction favoring the catching is provided by a spring 4 of treated steel in a thin strip of annular shape. The spring 4 has a plurality of corrugations 5 designed to enhance its resilience and has apertures or cavities through which the cams 1 are fitted. Return tabs 6 bear against one of the lateral surfaces of the respective cams 1 so as to push the latter towards their catching position.

The device as shown in FIGS. 1 and 2 further comprises two annular lateral bearings 7 each having a U-shaped cross section which can be seen in FIG. 2, equipped with an inner wing 8 and an outer wing 9 orientated in the direction of the cams 1. The cage 3 comprises two outer annular lips 10 housed inside annular spaces defined by the wings of the bearings.

Before fitting, these parts have to be kept joined axially together in the form of an assembly which must be capable of being handled without inadvertent disassembly of the members. When the assembly is fitted between the outer cylindrical surface of a shaft and the cylindrical bore of a housing which are not shown in the figures, the convex surfaces 1a and 1b of the cams 1 come into sliding contact with the bore and the shaft respectively, the catching being obtainable by pivoting of the cams 1 suitably synchronized under the action of the various tabs 6 of the spring strip of annular shape 4.

During operation, the lateral bearings 7 are in friction contact with the shaft and the bore of the housing and the metal cage 3 performs practically no function. It will be noted that the rolling up of the spring strip 4 into its annular shape may be done by overlapping the ends at the place of one of the cam passage apertures or in contiguous manner, the ends being disposed end-to-end, Reference will now be made to FIGS. 3 through 5 which show a first embodiment of the invention.

Figure 3:
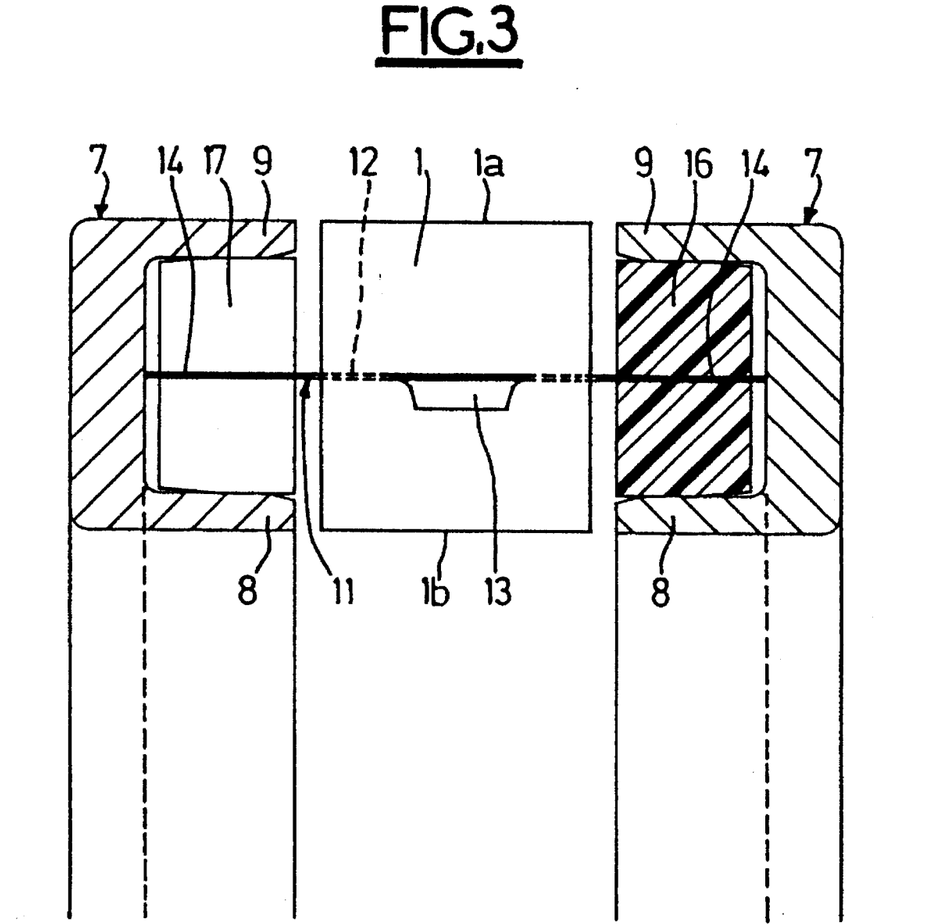
FIG. 3 is a partial view in cross section similar to FIG. 2 of a free wheel device according to a first embodiment of the invention wherein the axial locking between the lateral retention components and the spring is provided by molding the components onto the spring.

As shown in FIG. 3, the free wheel device of the invention comprises a plurality of cams 1 retained solely by a spring strip 11 of annular shape. The spring 11 has apertures 12 each receiving a catching cam 1. Each aperture has on one of its edges 12a (FIG. 5) a return tab 13 which can come into contact with a lateral surface of a catching cam 1 during the operation of the free wheel device as explained previously.

Figure 4:
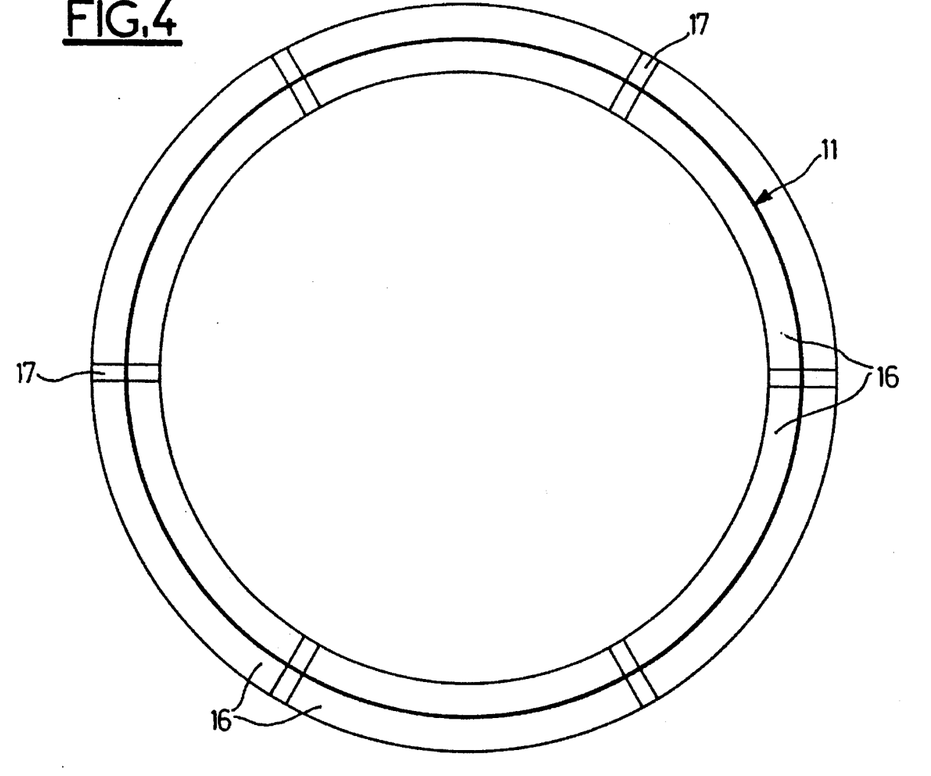
FIG. 4 is a lateral external view of the annular spring equipped with the molded retention components, the assembly capable of being used on the device illustrated in FIG. 3.
Figure 5:
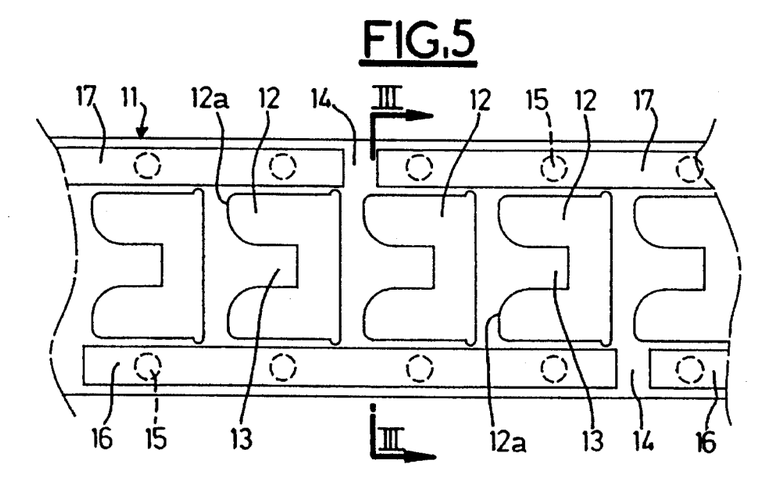
FIG. 5 is a developed partial plan view of the spring seen in FIGS. 3 and 4, showing the disposition of the sectors constituting the lateral retention components.

The annular spring 11 has lateral edges 14 comprising at regular intervals holes 15. Onto the edges 14 are molded, on either side of said edges, a plurality of individual annular sectors 16 and 17. In these conditions, one of the edges 14 comprises the molded annular sectors 16 whereas the other edge 14 comprises the molded annular sectors 17.

The set of the respective sectors 16 and 17 constitutes two lateral retention components. Taking into account the rigidity of the molded synthetic material which constitutes the sectors 16 and 17, the spring 11 assumes the annular shape of the abovementioned lateral retention components. In these conditions, it will be understood that by virtue of the existence of these lateral retention components, the assembly constituted by the catching cams 1 and the single spring strip 11 assumes and keeps its annular shape and its structure during the manipulation and the handling operations prior to the fitting between the shaft and the housing. This result is obtained despite the absence of the metal cage which therefore becomes unnecessary.

In the example illustrated in FIG. 3, the wheel device further comprises two lateral bearings 7 of U-shaped cross section having inner 8 and outer 9 wings which are directed towards the catching cams 1. The profile sectional of the annular sectors 16 and 17 is such that the latter can be inserted with a slight resilient grip between the wings 8 and 9 of the lateral bearings 7.

The assembly thus constituted is therefore completely locked axially. The assembling and handling of the assembly are thus greatly facilitated and this with an appreciable weight saving with respect to the free wheels of the prior art. In addition, the molding of the annular sectors 16 and 17 permits particularly inexpensive production.

Figure 6:
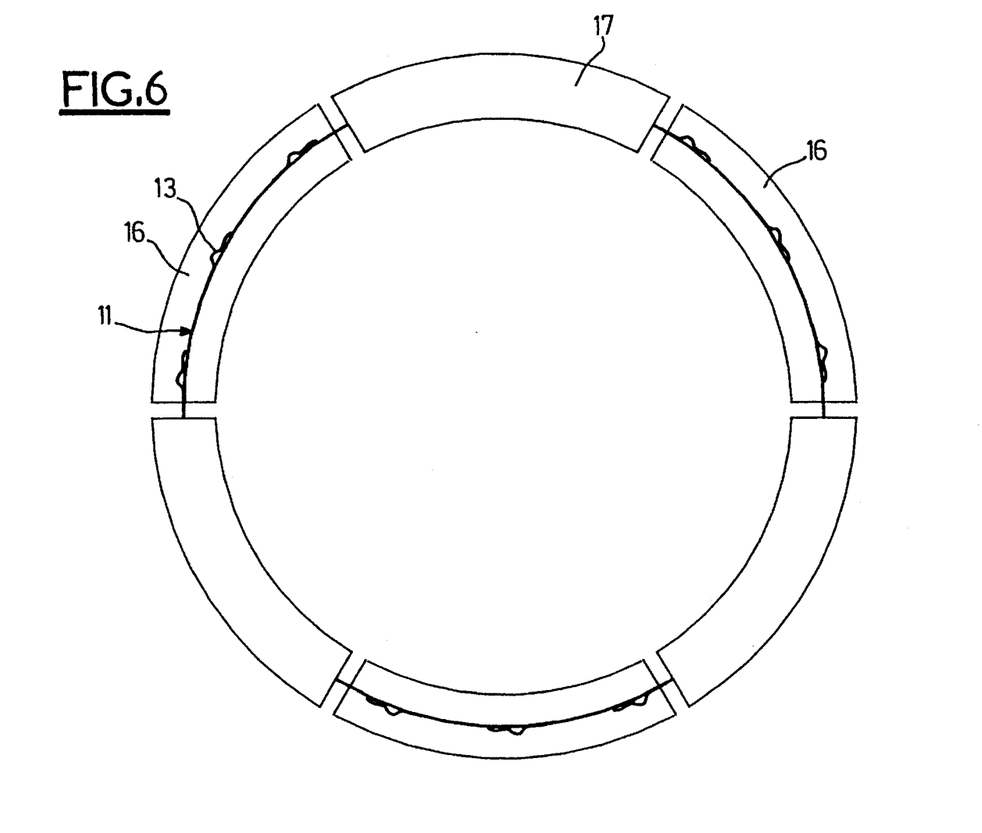
FIG. 6 is an external view similar to FIG. 4 showing a variant execution of the first embodiment.
Figure 7:
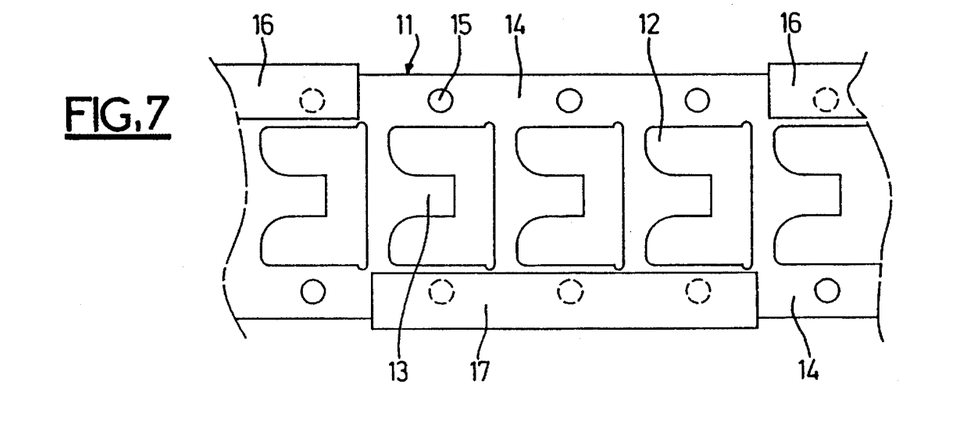
FIG. 7 is a developed partial view similar to FIG. 5 of the variant of FIG. 6.

In the variant of the first embodiment illustrated in FIGS. 6 and 7, the identical parts bear the same references. With respect to the variant of FIGS. 3 through 5, the variant of FIGS. 6 and 7 is distinguished essentially by the molding thereon of the annular sectors which projects axially beyond the lateral edges of the spring as also by the circumferential disposition of said sectors. The circumferential length of each annular sector 16, 17 corresponds to the location of several apertures 12, as can be seen in FIG. 7. The annular sectors 16 and 17 are disposed alternately on each side of the row of apertures or windows 12. A saving is therefore made in the synthetic material intended to form the lateral retention components, with respect to the variant illustrated in FIGS. 4 and 5 where the separation between the various sectors 16 and 17 is minimal.

Figure 8:
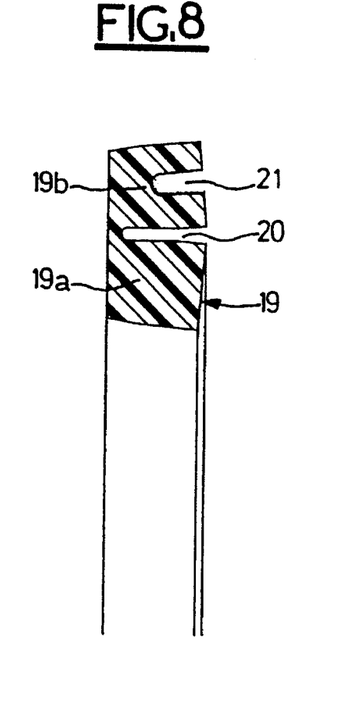
FIGS. 8 and 9 show in partial cross section a lateral retention component of the invention according to a second embodiment wherein the axial locking between the lateral retention components and the spring is provided via resilient pinching of the spring.
Figure 9:
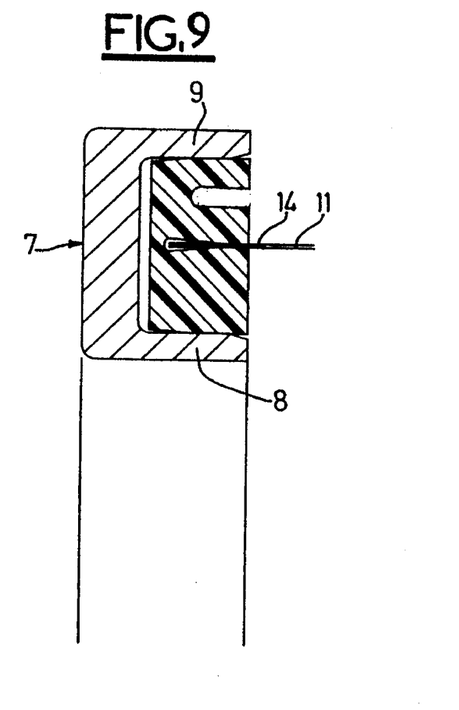

FIGS. 8 and 9 illustrate a second embodiment of the invention wherein the locking between the lateral retention components and the spring is no longer made by molding said lateral retention components onto the spring, but by pinching.

As shown in FIG. 8, the lateral retention component 19 comprises a ring of resilient synthetic material equipped with an annular axial channel or slot 20, for pinching, which separates it practically between an inner annular portion 19a and an outer annular portion 19b. The outer annular portion 19b additionally has an annular groove 21 improving the general suppleness of the annular component 19. As can be seen in FIG. 8, the annular component 19, has in cross section a slightly trapezoidal profile before fitting, the pinching slot 20 being open. During fitting, one of the edges 14 of the spring 11 is inserted into the pinching slot 20, and then the assembly is slid inside a lateral bearing 7 as illustrated in FIG. 9. The annular lateral retention component 19 is of such a size that it is then gripped resiliently between the inner 8 and outer 9 wings of the bearing 7, which results in the pinching of the edge 14 of the spring 11 inside the pinching slot 20.

Figure 10:
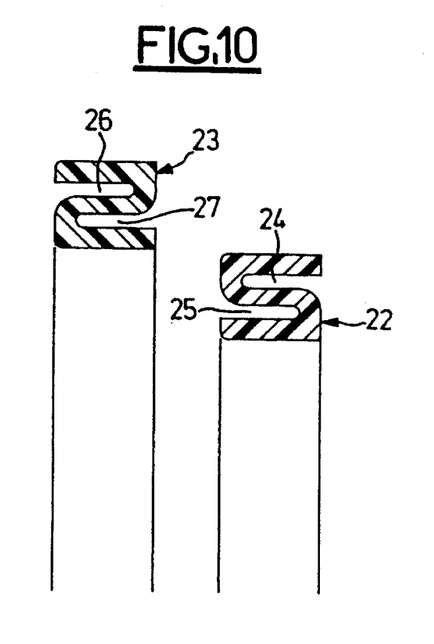
FIGS. 10 and 11 show in partial cross section similar to FIGS. 8 and 9 a variant of the second embodiment, wherein the lateral retention component is constituted by two annular parts.
Figure 11:
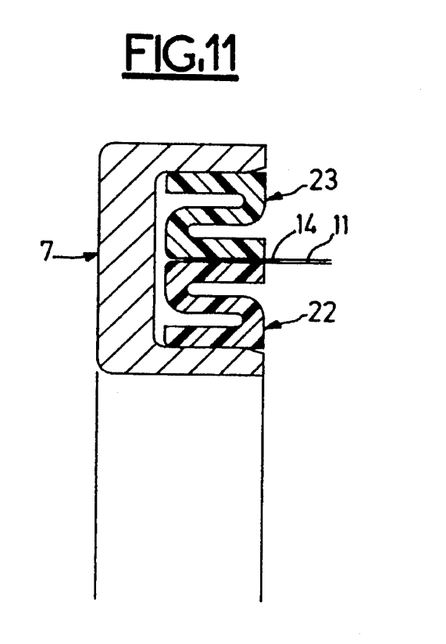

FIGS. 10 and 11 show a variant of the second embodiment wherein each lateral retention component is constituted by an inner ring 22 and an outer ring 23. The two rings 22, 23 have, as can be seen in FIG. 10, the same S-shaped sectional profile by virtue of the existence of two annular grooves 24, 25 and 26, 27 open respectively on two opposed radial surfaces. The two rings 22, 23 thus have a certain resilient suppleness. The bore of the outer ring 23 corresponds approximately to the outer diameter of the inner ring 22. These diameters are however such that, after fitting as illustrated in FIG. 11, the inner 22 and outer 23 rings are capable of exerting a resilient pinching effect on the edge 14 of the spring 11, the assembly being retained resiliently gripped inside the lateral bearing 7.

In FIGS. 8 through 11, the axial locking between the lateral retention components and the lateral bearings 7 is obtained by resilient gripping.

Figure 12:
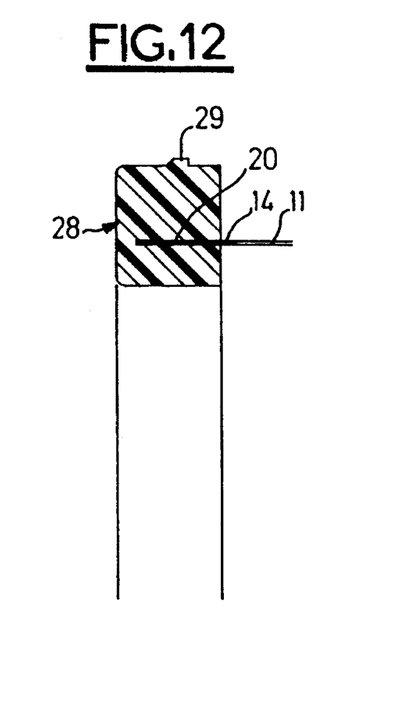
FIGS. 12, 13 and 14 illustrate in partial cross section another variant of the second embodiment, wherein the lateral retention component is additionally locked by catching with a lateral bearing.
Figure 13:
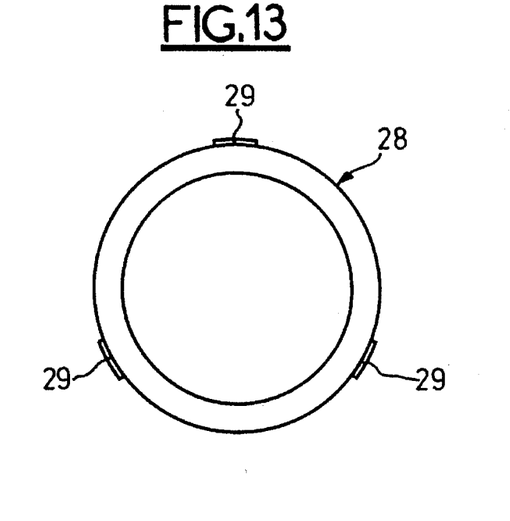
Figure 14:
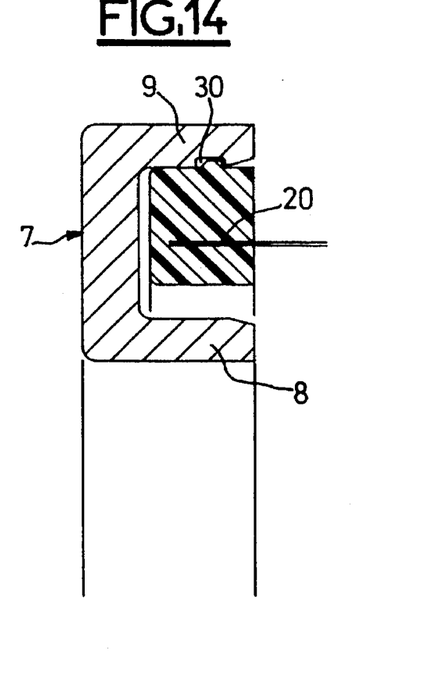

FIGS. 12 through 14 illustrate another variant of the second embodiment wherein the lateral retention components 28 appear in the form of a ring of synthetic material comprising an annular axial channel or slot 20 into which the spring is forcibly inserted, said retention components additionally having on their outer peripheral surface three catches 29 provided for example at 120° respectively from one another. The catches 29 are capable of entering a peripheral channel 30 made inside the outer wing 9 of the lateral bearing 7. As can be seen in FIG. 14, the annular retention component 28 which does not come into contact with the inner wing 8 of the lateral bearing 7 is axially locked with said lateral bearing 7 by virtue of the catches 29.

Figure 15:
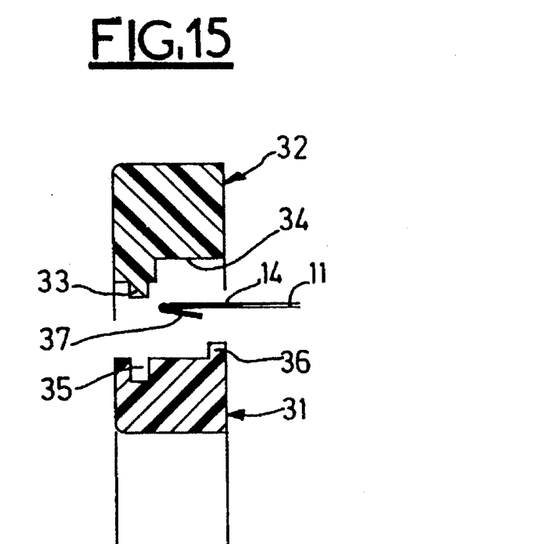
FIGS. 15, 16 and 17 show a third embodiment wherein the axial locking between the lateral retention components and the spring is provided by catching of the spring.
Figure 16:
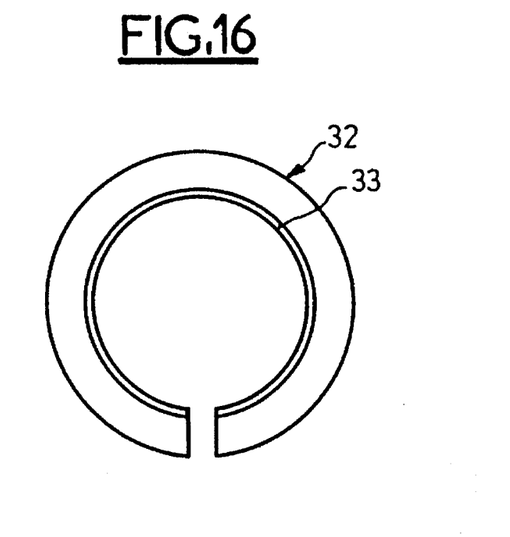
Figure 17:
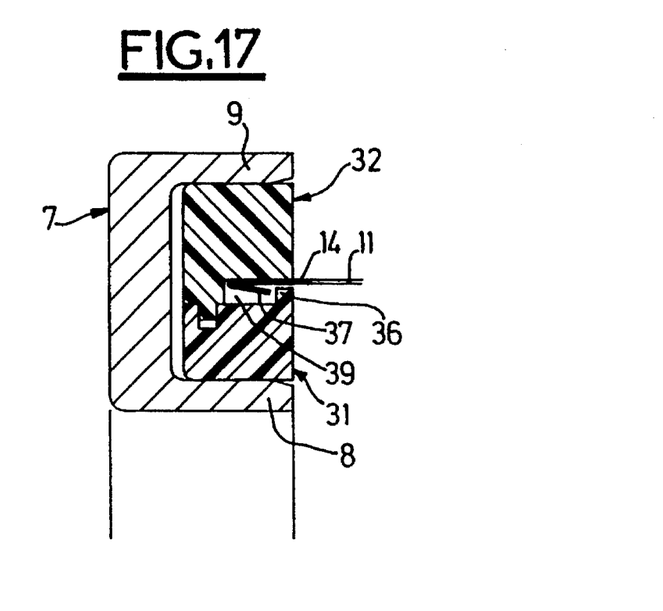

In the third embodiment shown in FIGS. 15 through 17, the lateral retention components are once again constituted by an inner ring 31 and an outer ring 32. The bore of the outer ring 32 has an annular rib 33 and a cylindrical zone 34 of greater diameter than the rib 33.

The outer cylindrical surface of the inner ring 31 has an annular channel 35 Which is disposed so as to be capable of receiving the rib 33 of the outer ring 32. A projecting annular rib 36 can come into the vicinity of the cylindrical surface 34 of the outer ring 32, leaving a gap free. In this embodiment, the edge 14 of the spring 11 comprises a plurality of bent-back parts 37.

In order to facilitate the fitting of the assembly, the outer ring 32 is split as can be seen in FIG. 16. After the edge 14 of the spring 11 equipped with the bent-back parts 37 has been inserted between the inner ring 31 and the outer ring 32, the assembly is inserted between the outer 9 and inner 8 wings of the lateral bearing 7. The sizes of rings 31 and 32 are such that the assembly is gripped inside the bearing 7, the annular rib 33 entering the annular channel 35 and an annular aperture 39 being defined between the rings 31 and 32 as can be seen in FIG. 17. This annular aperture 39 receives the bent-back parts 37 which abut against the rib 36. The axial locking of the spring 11 with respect to the lateral retention component constituted by the rings 31 and 32 and with respect to the lateral bearing 7 is thus ensured by this assembly.

Figure 18:
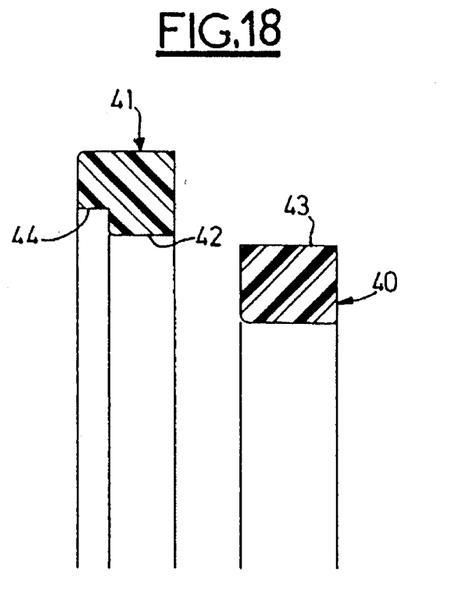
FIGS. 18, 19 and 20 show a variant of the third embodiment.
Figure 19:
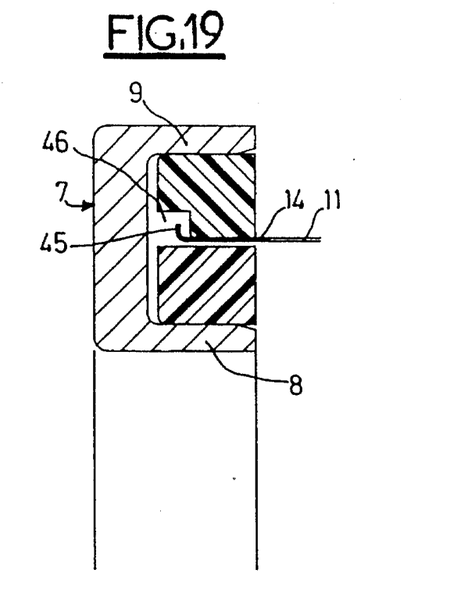
Figure 20:
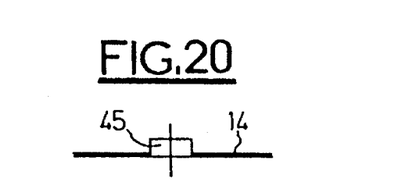

In the variant construction of the third embodiment shown in FIGS. 18 through 20, the lateral retention component is once again constituted by an inner ring 40 interacting with an outer ring 41. The outer ring 41 comprises a portion of bore 42 having a diameter slightly greater than the outer diameter of the cylindrical portion 43 of the inner ring 40. The outer ring 41 has, in addition, an inner cylindrical zone 44 of diameter greater than the cylindrical portion 42. In this variant construction, the lateral edges 14 of the spring 11 have a plurality of portions 45 bent back at 90° at their tip.

After the fitting illustrated in FIG. 19, the rings 40, 41 which are lightly gripped between the respective wings 8 and 9 of the lateral bearing 7 allow an annular passage to remain between them for the edge 14 of the spring 11 whose bent-back portions 45 are housed in an annular recess 46 and abut against the step of the outer ring 41, defined between the portions of bore 42 and 44.

The axial locking between the spring 11, the lateral retention component constituted by the rings 40, 41, and the lateral bearing 7 is thus ensured by this assembly.

Figure 21:
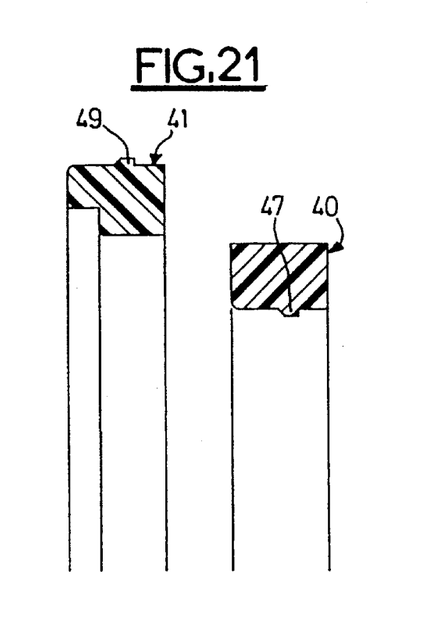
FIGS. 21 and 22 show the same variant as FIGS. 18 through 20, but in this case, the lateral retention component is locked by catching with a lateral bearing.
Figure 22:
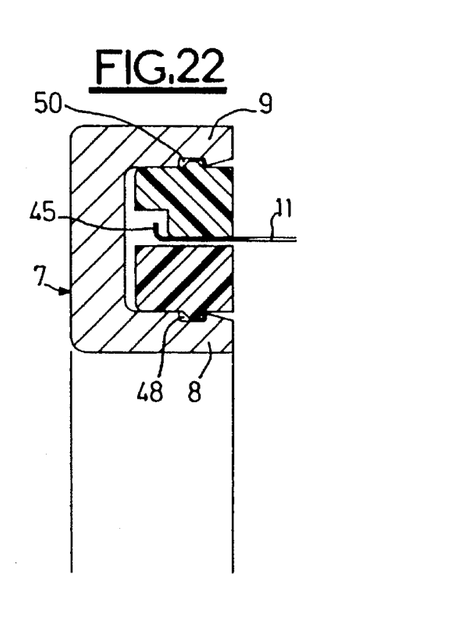

The variant of the third embodiment illustrated in FIGS. 21 and 22 is similar to the variant construction illustrated in FIGS. 18 through 20. It differs from the latter solely in the mode of axial locking between the rings 40, 41 and the lateral bearing 7. In the variant illustrated in FIGS. 21 and 22 in fact, the inner ring 40 has in its bore catches 47 which can enter an annular channel 48 of the inner wing 8 of the bearing 7. In the same manner, the outer ring 41 has on its outer cylindrical surface catches 49 which can enter a channel 50 made in the internal cylindrical surface of the outer wing 9. The spring 11 has the same structure as in the variant construction of FIGS. 18 through 20 and therefore has a plurality of bent-back parts 45. In this variant construction, the assembly illustrated in FIG. 22 is made by fitting the rings 40 and 41 without gripping inside the lateral bearing 7 and the axial locking with respect to said bearing 7 is ensured by virtue of the catches 47 and 49.

FIGS. 23 through 29 illustrate other variants of the third embodiment, wherein the spring 11 interacts with a lateral retention component 51 comprising on its outer cylindrical surface projecting catches 52 designed to interact with a corresponding channel of the outer wing 9 of a lateral bearing 7 not shown in FIGS. 23 through 29. The axial locking between the spring 11 and the lateral retention component 51 is made by means of different catching components made on the edge 14 of the spring 11, the edge 14 being inserted inside a catching slot 53 made in the lateral retention component 51.

Figure 23:
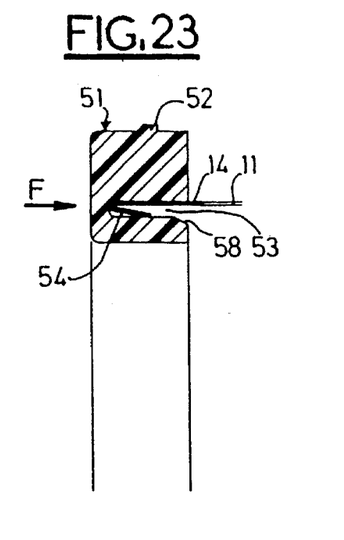
FIGS. 23 through 30 show other variants of the third embodiment shown in partial cross section, the means for catching of the spring being additionally shown in partial developed view, and in this case also each lateral retention component is locked by catching with a lateral bearing.
Figure 24:
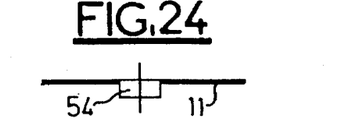

In FIGS. 23 and 24, each catching component is constituted by an individual bent-back part 54 forming an acute angle with the lateral edge 14 of the spring 11.

Figure 25:
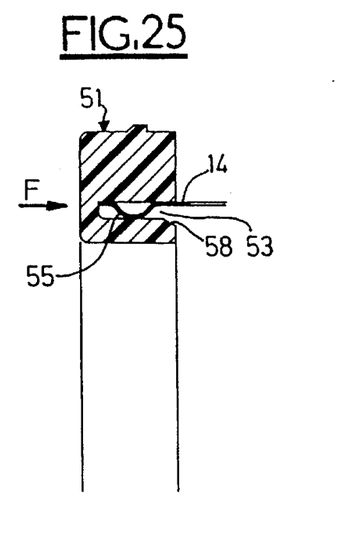
Figure 26:
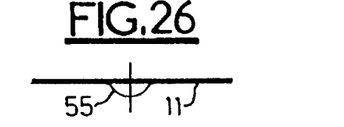

In FIGS. 25 and 26, the catching component is constituted by a projecting boss 55 of spherical profile obtained for example by stamping and made in the edge 14 of the spring 11.

Figure 27:
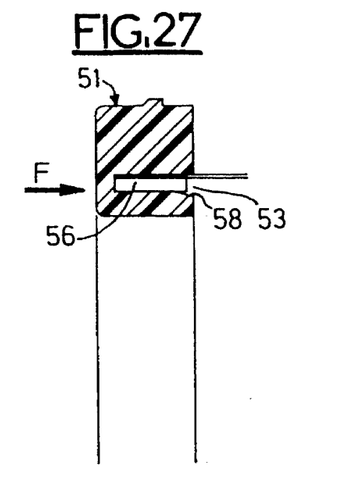
Figure 28:
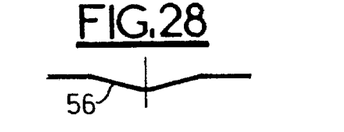

In FIGS. 27 and 28, the catching component is constituted by an angular punched zone 56.

Figure 29:
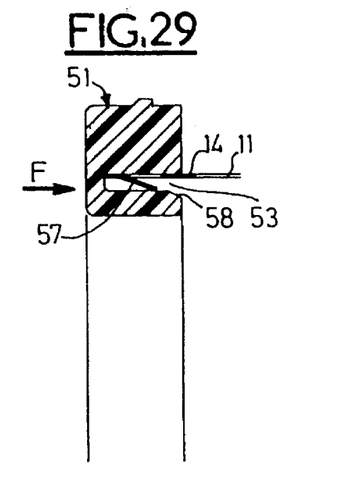
Figure 30:
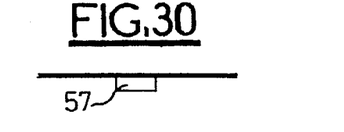

In FIGS. 29 and 30, the catching component is constituted by a slash or lug 57 cut out and bent back from the edge 14 of the spring 11.

In all cases, the catching components 54, 55, 56 and 57 are gripped resiliently inside the catching slot 53 of the lateral retention component 51. In order to facilitate the fitting, the slot 53 is delimited by an annular chamfer 58.

It will be noted that the catching components 54, 55, 56 and 57 are advantageously made at the place of each of the windows or apertures 12 of the spring 11.

In the various embodiments or variant constructions illustrated, provision has been made for the addition of lateral bearings 7, these bearings being designed to ensure the centering of the shaft and of the housing respectively between which the free wheel is fitted, and to ensure the passage of the radial loads between said shaft and said housing. In applications in which these functions are not necessary or else are performed by members outside the free wheel, the lateral bearings are no longer essential and may then be eliminated. In these special cases, use will preferably be made of the embodiments or variant constructions wherein the axial locking between the spring 11 and the lateral retention components is obtained without the presence of the lateral bearings 7 being necessary. This is true in particular of the first embodiment illustrated in FIGS. 3 through 7. This is also true of the variant of the second embodiment illustrated in FIGS. 12 through 13 and the variants of the third embodiment illustrated in FIGS. 23 through 29. Of course, in all cases where the lateral bearings are not used, the catches 29, 47, 49 and 52 may be eliminated.

The free wheel devices according to the present invention are particularly inexpensive to produce and easy to assemble and to handle and this with an appreciable weight saving with respect to the free wheel devices of the prior art.

I claim:

1. A free wheel device designed to be inserted between a shaft having an outer cylindrical surface, and a housing having a cylindrical bore of the type comprising:

a plurality of pivotable catching cams adapted to contact said outer cylindrical surface and said cylindrical bore upon pivoting movement, each of said cams being movable to and from a catching position;

one single strip of spring material having opposite lateral edges and a plurality of spaced apertures adapted for receiving and retaining said cams, said strip further comprising a plurality of return tabs, each of said tabs being adapted for biasing one of said cams toward its said catching position;

two opposite lateral bearing means adapted to be introduced between said outer cylindrical surface and said cylindrical bore; and opposite lateral retention means each embedded within one of said lateral bearing means, each said retention means having annular axial slot means for receiving one of said lateral edges of said single strip and locking said single strip while giving said strip an annular shape.

2. A free wheel device according to claim 1 wherein said retention means are molded onto the lateral edges of the strip.

3. A free wheel device according to claim 2 wherein the lateral edges of the strip are provided with perforations for anchorage of said retention means.

4. A free wheel device according to claim 1 wherein said retention means are formed of several individual annular sectors molded interiorly and exteriorly on the lateral edges of the strip.

5. A free wheel device according to claim 1 wherein each of said retention means includes inner and outer rings between which a said lateral edge of the strip is gripped.

6. A free wheel device according to claim 5 wherein each outer ring has a radial slot to facilitate fitting and to prestress said outer ring when the outer ring is fitted in said bearing means.

7. A free wheel device according to claim 1 wherein said slot means radially pinch the lateral edges of the strip to lock the strip to the retention means.

8. A free wheel device according to claim 1 wherein the lateral edges of the strip include axially catching means for locking the strip to said retention means.

9. A free wheel device according to claim 1 wherein each of the bearing means has a U-shaped cross section which includes an inner wing and an outer wing.

10. A free wheel device according to claim 9 wherein the inner and outer wings of the bearing means resiliently grip said retention means.

11. A free wheel device according to claim 9 wherein the inner and outer wings of the bearing means have shapes which mate with said retention means to lock said retention means to said bearing means.

12. A free wheel device according to claim 11 wherein a channel is formed on at least one said wing of the bearing means, and the retention means is provided with catches which extend into said channel to lock the retention means to the bearing means.

13. In a cam and spring assembly for a free wheel device, the combination of:

a single strip of spring material having opposite lateral edges and a plurality of peripherally spaced apertures;

a plurality of pivotable catching cams adapted to contact an outer cylindrical surface of a shaft and a cylindrical bore of a housing of the free wheel device, each said cam being received in one of said aperture and being movable to and from a catching position, said single strip comprising a plurality of return tabs, each said tab being adapted for biasing one of said cams toward its said catching position; and, opposite lateral retention means each having an annular axial slot means for receiving one of said lateral edges of said single strip and locking said single strip while giving said strip an annular shape.

14. A cam and spring assembly according to claim 13 wherein said retention means are molded onto the lateral edges of the strip.

15. A cam and spring assembly according to claim 14 wherein the lateral edges of the strip are provided with perforations for anchorage of said retention means.

16. A cam and spring assembly according to claim 13 wherein said retention means are formed of several individual annular sectors molded interiorly and exteriorly on the lateral edges of the strip.

17. A cam and spring assembly according to claim 13 wherein each of said retention means includes inner and outer rings between which a said lateral edge of the strip is gripped.

18. A cam and spring assembly according to claim 17 wherein each outer ring has a radial slot to facilitate fitting and to prestress said outer ring when the outer ring is fitted in a bearing means.

19. A cam and spring assembly according to claim 13 wherein said annular axial slot means radially pinch the lateral edges of the strip to lock the strip to the retention means.

20. A cam and spring assembly according to claim 13 wherein the lateral edges of the strip include axially catching means for locking the strip to said retention means.

21. A free wheel device designed to be inserted between a shaft having an outer cylindrical surface and a housing having a cylindrical bore of the type comprising:

- a plurality of pivotable catching cams adapted to contact said outer cylindrical surface and said cylindrical bore upon pivoting movement, each of said cams being movable to and from a catching position;
- one single strip of spring material having opposite lateral edges and a plurality of spaced apertures adapted for receiving and retaining said cams, said strip further comprising a plurality of return tabs, each of said tabs being adapted for biasing one of said cams toward its said catching position;
- two opposite lateral bearing means adapted to be introduced between said outer cylindrical surface and said cylindrical bore; and,
- opposite lateral retention means each embedded within one of said lateral bearing means;
- each said lateral edge of said strip having axial catching means for interacting with the lateral retention means for locking said single strip with said lateral retention means while giving said strip an annular shape.

22. A free wheel device according to claim 21 wherein each of said retention means includes inner and outer rings between which a said lateral edge of the strip is gripped.

23. A free wheel device according to claim 21 wherein each of the bearing means has a U-shaped cross section which includes an inner wing and an outer wing.

24. A free wheel device according to claim 23 wherein the inner and outer wings of the bearing means resiliently grip said retention means.

25. A free wheel device according to claim 23 wherein the inner and outer wings of the bearing means have shapes which mate with said retention means to lock said retention means to said bearing means.

26. A free wheel device according to claim 25 wherein a channel is formed on at least one said wing of the bearing means, and the retention means is provided with catches which extend into said channel to lock the retention means to the bearing means.

27. In a cam and spring assembly for a free wheel device, the combination of:

- a single strip of spring material having opposite lateral edges and a plurality of spaced apertures, said lateral edges being provided with axial catching means;
- a plurality of pivotable catching cams adapted to contact a cylindrical surface of a shaft and a cylindrical bore of a housing of the free wheel device upon pivoting movement and to be received and retained within each of said apertures, each said cam being movable to and from a catching position;
- said single strip further comprising a plurality of return tabs, each said tab being adapted for biasing one of said cams toward its said catching position; and,
- opposite lateral retention means for interacting with said axial catching means of said lateral edges of said strip for locking said strip with said lateral retention means while giving said strip an annular shape.

28. A cam and spring assembly according to claim 27 wherein each of said retention means includes inner and outer rings between which a said lateral edge of the strip is gripped.

* * * * *